UNITED STATES PATENT OFFICE.

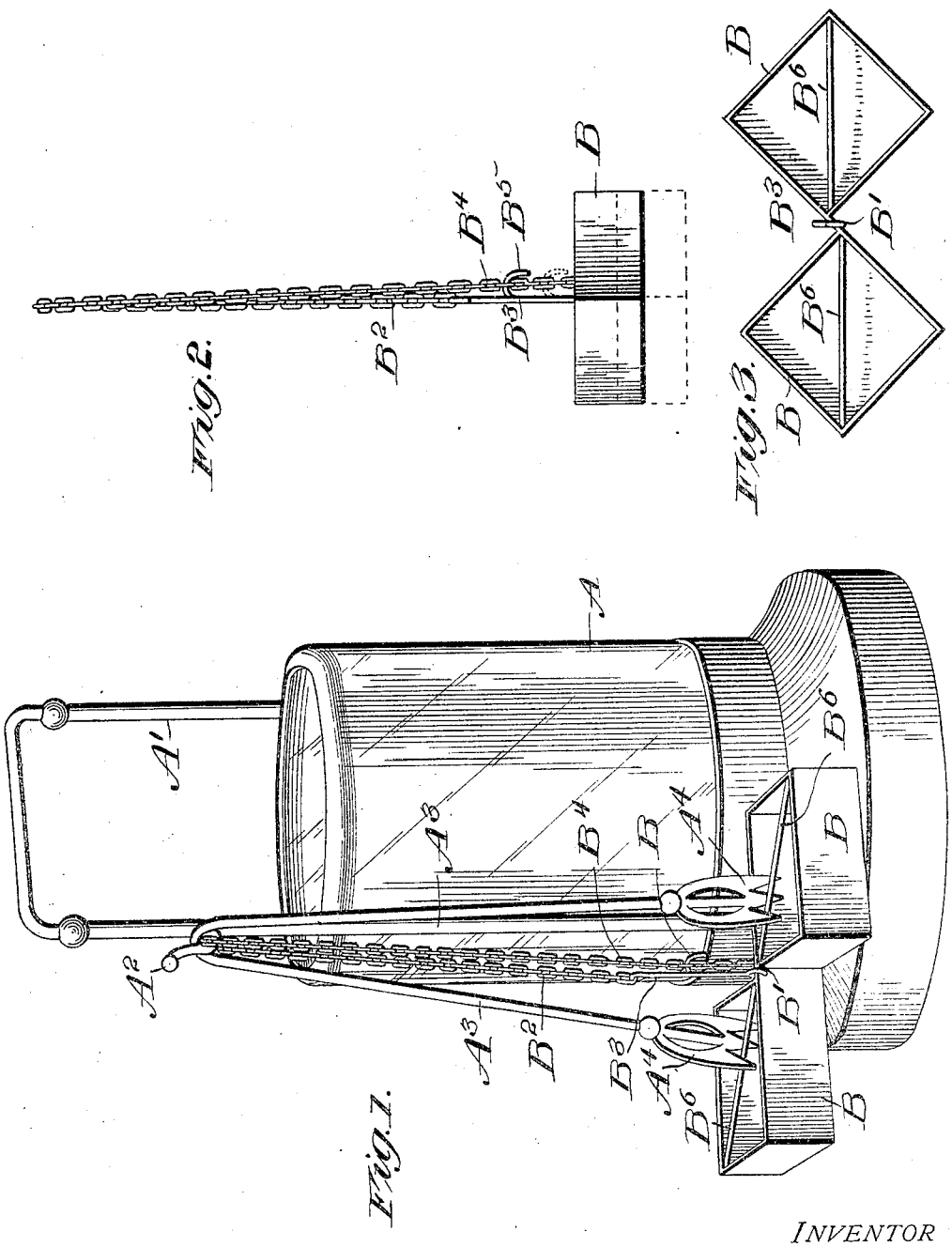

KATE MERCER, OF GREELEY, COLORADO.

ATTACHMENT FOR PICKLE-CASTERS.

No. 807,761.　　Specification of Letters Patent.　　Patented Dec. 19, 1905.

Application filed September 5, 1905. Serial No. 277,074.

*To all whom it may concern:*

Be it known that I, KATE MERCER, a citizen of the United States, residing at Greeley, in the county of Weld, State of Colorado, have invented certain new and useful Improvements in Attachments for Pickle-Casters, of which the following is a specification, reference being had therein to the accompanying drawings.

This invention relates to an attachment for pickle-casters, and particularly to a drip-cup adapted to be suspended therefrom to receive the drippings from the fork or tongs used to remove the pickles.

The invention has for an object to provide a drip-cup having supporting means by which the cup may be adjusted at different heights relative to the length of the pickle fork or tongs used and adapted to be supported upon the hook or projection usually provided upon the side of casters for the reception of said tongs.

Other and further objects and advantages of the invention will be hereinafter set forth, and the novel features thereof defined in the appended claims.

In the drawings, Figure 1 is a perspective of a pickle-caster having the invention applied thereto. Fig. 2 is an elevation of the drip-cup removed, and Fig. 3 is a plan of said cup.

Like letters of reference refer to like parts throughout the several figures of the drawings.

The letter A designates a pickle jar or caster of any desired construction or configuration, preferably provided with the usual handle A', extending from the top thereof, and provided with a supporting hook or projection $A^2$ upon one side adapted to receive the fork or tongs $A^3$ used for removing the pickles from the jar. These tongs may be of any ordinary construction and provided with prongs $A^4$ at their free ends.

The drip-cup B is preferably formed of separate members of any desired configuration joined together—for instance, of rectangular form, as herein shown, joined at one angle thereof. From this point B' of jointure the two members of the receptacle are provided with a flexible supporting member $B^2$—for instance, a chain, as herein shown, which is connected to the cup by means of an interposed rod $B^3$, pivotally secured to the cup and chain, while the opposite free end $B^4$ of the chain is adapted to engage a retaining-hook $B^5$, extended from the rod $B^3$ at one side and adapted to engage the links of the chain, so as to permit the vertical adjustment of the cups relatively to the length of the pickle-tongs used. This supporting strand or chain passes over the projection $A^2$, upon which the tongs are supported, so that the ends $A^4$ of the latter will rest within the members of the cup. For the purpose of preventing the swinging of these tongs as the caster is moved and also providing means by which adhering material may be removed from the tongs the cups are provided with cross-wires $B^6$, over which the prongs of the tongs are adapted to lie or with which they may be engaged.

With the use of this invention it will be seen that the drippings of vinegar or other liquids from the tongs are caught by the cup and prevented from contact with the table upon which the caster stands or from falling upon the plated base of the caster, thus preventing injury to the plating by the acid. It will also be observed that by a proper adjustment of the parts the cross-wire of the drip-cups may be brought in such position that the prongs of the fork or tongs will engage the same and any swinging movement of the tongs out of the cups prevented when the caster is moved or handled.

Having now described my invention and set forth its merits, what I claim, and desire to secure by Letters Patent, is—

1. The combination with a pickle-caster having supporting means for a fork or tongs, of a drip-cup, and means carried by said cup for supporting it beneath said supporting means adjacent to the lower end of said fork.

2. The combination with a table-caster having a supporting-hook for a fork or tongs, of a drip-cup, means for supporting said cup beneath said hook adjacent to the lower end of said fork, and means for adjusting the length of said support relative to said fork.

3. An attachment for table-casters comprising a plurality of drip-cups, flexible supporting means extending therefrom, and means carried by said cups for adjusting the length of said supporting means.

4. An attachment for table-casters comprising a plurality of drip-cups, flexible supporting means extending therefrom, a retaining-hook carried by said cups for adjusting the length of said supporting means, and a cross-rod extending across said cups.

In testimony whereof I affix my signature in presence of two witnesses.

KATE MERCER.

Witnesses:
  EMMA L. RICHEY,
  MRS. H. C. LUTHER.